United States Patent

Martucci

[11] Patent Number: 5,124,878
[45] Date of Patent: Jun. 23, 1992

[54] COATED BRAIDED HOSE METHOD

[75] Inventor: Norman S. Martucci, Birmingham, Mich.

[73] Assignee: Teleflex Incorporated, Limerick, Pa.

[21] Appl. No.: 730,378

[22] Filed: Jul. 12, 1991

Related U.S. Application Data

[63] Continuation of Ser. No. 416,151, Oct. 2, 1989, abandoned, which is a continuation-in-part of Ser. No. 305,643, Feb. 2, 1989, abandoned.

[51] Int. Cl.$^5$ .................................................. H05F 3/00
[52] U.S. Cl. .................................. 361/215; 138/125; 138/DIG. 3; 174/47
[58] Field of Search .................. 174/47; 361/212, 215, 361/220; 138/123, 124, 125, DIG. 3

[56] References Cited

U.S. PATENT DOCUMENTS

| | | | |
|---|---|---|---|
| 2,783,173 | 2/1957 | Walker et al. | 138/DIG. 3 |
| 2,828,236 | 3/1958 | West | 138/DIG. 3 |
| 3,116,760 | 1/1964 | Matthews | 138/125 |
| 3,547,162 | 12/1970 | Schnerer | 138/125 |
| 3,682,201 | 8/1972 | Atwell et al. | 138/125 |
| 3,907,955 | 9/1975 | Viennot | 174/47 |
| 3,944,453 | 3/1976 | Chudgar et al. | 138/125 |
| 4,007,070 | 2/1977 | Busdiecker | 138/123 |
| 4,059,847 | 11/1977 | Phillips et al. | 361/215 |
| 4,107,452 | 8/1978 | Razui | 361/215 |
| 4,111,237 | 9/1978 | Mutzner et al. | 138/125 |
| 4,196,464 | 4/1980 | Russell | 361/215 |
| 4,215,384 | 7/1980 | Elson | 361/215 |
| 4,303,457 | 12/1981 | Johansen et al. | 138/123 |
| 4,311,547 | 1/1982 | Biggs et al. | 156/244.13 |
| 4,330,811 | 5/1982 | Bordner | 361/212 |
| 4,394,705 | 7/1983 | Blachman | 361/215 |
| 4,697,300 | 10/1987 | Warlop | 361/212 |
| 4,786,757 | 11/1988 | Owensby et al. | 361/215 |
| 4,866,565 | 9/1989 | Wray, Jr. | 361/215 |
| 4,870,535 | 9/1989 | Matsumoto | 361/215 |

*Primary Examiner*—Jeffrey A. Gaffin
*Attorney, Agent, or Firm*—Reising, Ethington, Barnard, Perry & Milton

[57] ABSTRACT

A lightweight hose assembly of the type adapted for carrying fuels and other corrosive fluids. The assembly (10) includes a tubular member (11) and a pair of coupling members (20). The tubular member (11) includes an inner liner (12) of a fluorocarbon polymer. A glass fiber is braided about the exterior of the inner liner (12) to form a braided layer (13). The assembly (10) further includes an outer fluorocarbon coating (14) dispersed throughout the braided layer (13) for preventing kinking or permanent deformation of the inner liner (12). A conductive strip (16) is formed on the inner liner (12) for dissipating electrical charges accumulated in the inner liner (12). A method of making the assembly (10) comprises the steps of extruding the inner liner (12). A nonmetallic material (13) is then braided about the exterior of the liner (12). The inner liner (12) and braided layer (13) are then passed through a reservoir containing a solution of the fluorocarbon polymer. The solvent is then removed, leaving a fluorocarbon polymer coating (14) dispersed throughout the braided layer (13).

12 Claims, 2 Drawing Sheets

COATED BRAIDED HOSE METHOD

RELATED APPLICATION

This application is a continuation of application Ser. No. 416,151, filed Oct. 2, 1989, now abandoned, which is a continuation-in-part of Ser. No. 305,643, filed Feb. 2, 1989, now abandoned.

TECHNICAL FIELD

This invention relates to a hose construction. Specifically, the invention relates to a hose assembly adapted for carrying vehicle fuels.

BACKGROUND ART

Hose assemblies used to carry fuels are well known in the art. The hose should preferably be strong and resistant to heat and chemical degradation. These hoses are subject chemical breakdown by the various fluids which flow through them. Further, these hoses are typically routed through the engine compartment of the vehicle to deliver fuel to the engines. These engines are hot and thus, the hoses used to carry fuel are subject to breakdown from the heat.

TEFLON hoses provide the necessary physical properties for carrying fuels. A major problem with these types of hoses is that when used alone, i.e., only a TEFLON liner or conduit, they tend to get bent during installation and they kink. This kink or deformation remains permanent and provides constant resistance to fluid flow through the hose. To solve this problem, one known hose assembly includes an inner TEFLON tubular member. The inner tubular member is surrounded by a tightly wound metallic braid. The metallic braid allows the TEFLON inner tubular member to bend to a certain degree without kinking. However, if bent past a certain point the metallic braid aids in the kinking of the inner tubular member. This assembly, has three major disadvantages. First, the metallic braid tends to abrade the exterior of the inner tubular member. This causes leaks from the inner tubular member. The second problem is that the exterior metallic braided casing is thermally and electrically conductive. More important is that the metallic braid will retain heat and transfer the heat to the fuel moving through the inner tubular member causing fuel system problems. Finally, when used in an automotive environment, the metallic braid transmits noise during operation of the vehicle which is undesirable.

Copending application Ser. No. 535,734, filed Jun. 11, 1990, which is a continuation-in-part of U.S. Ser. No. 244,319 filed Sep. 8, 1988 now abandoned and assigned to the assignee of the subject invention discloses a hose assembly for carrying fuels. The assembly includes an inner fluorocarbon polymer liner. In one embodiment, glass fiber is braided about the inner liner. An outer layer of a fluorocarbon foam is disposed over the glass fiber braided layer.

U.S. Pat. No. 4,111,237 to Mutzner et al issued Sep., 5, 1978 discloses a hose assembly. The assembly includes a polychloroprene inner liner. A glass fiber is then braided about the exterior of the inner liner. A rubber layer is then wrapped over the braided layer. A second braided layer of nylon is then placed about the rubber layer. Finally, a cover of polychloroprene is then extruded about the second braided layer.

U.S. Pat. No. 3,547,162 to Schuerer issued Dec. 15, 1970 discloses a plastic pipe assembly. The assembly includes an inner liner of a synthetic plastic made from cross linked olefinic polymers. A fiber braided layer is disposed over the inner liner. Finally, a foamed layer of synthetic plastic is disposed about the synthetic fiber reinforcement. By utilizing cross linked olefinic polymers, the system is deficient in that it cannot be used to carry vehicle fuels, as such fuels would degrade the inner liner. Further, this assembly requires a very thick outer casing to provide the necessary strength.

SUMMARY OF INVENTION AND ADVANTAGES

According to the present invention there is provided a hose assembly comprising a tubular member and coupling means for connecting the ends of the tubular member to fittings for conducting fluid therethrough. The tubular member includes an inner organic polymeric liner. A braided layer is disposed about the exterior of the inner liner. The assembly is characterized by including a coating dispersed throughout the braided layer from the outer periphery radially inwardly toward the inner liner. The coating is for strengthening the hose assembly.

A method of making a hose assembly is also provided. The method comprises the steps of providing an inner tubular liner of organic polymeric material. A material is then braided about the exterior of the tubular liner. A solution of organic polymeric material and at least one solvent is dispersed throughout the braided material.

Accordingly, there is provided a hose assembly and method for making the same. The assembly includes a coating dispersed throughout a braided layer. The coating dispersed throughout the braided layer provides a thin coating which covers the fibers in the braided layer. This coating provides the necessary strength so that the inner tubular member does not kink or deform upon bending. By using a coating dispersed throughout the braided material the weight, size, and cost of the hose are all substantially reduced. Further, the assembly is resistant to both heat and chemical degradation which makes it suitable for use in automotive environments for carrying fuels. Finally, the assembly is not thermally conductive. Thus heat from the exterior of the hose will not be transmitted to the fuel through the hose assembly.

FIGURES IN THE DRAWINGS

Other advantages of the present invention will be readily appreciated as the same becomes better understood by reference to the following detailed description when considered in connection with the accompanying drawings wherein.

DETAILED DESCRIPTION OF THE DRAWINGS

Figure 2:
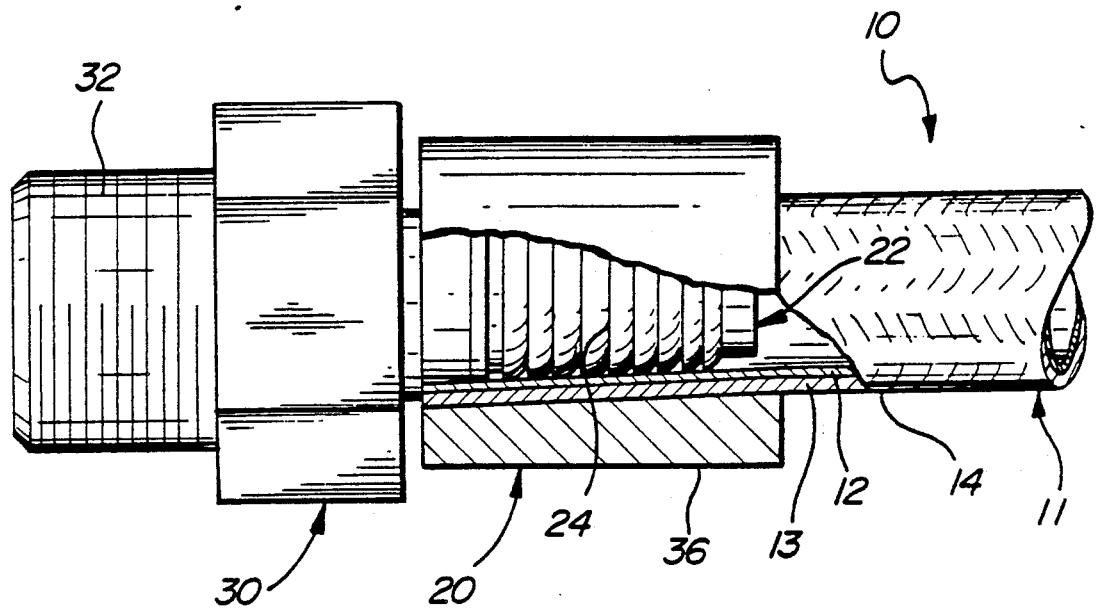
FIG. 2 is a side view partially broken away of the preferred embodiment of the instant invention including a coupling member.

A hose assembly made in accordance with the instant invention is generally shown at 10 in the Figures. The assembly 10 includes a tubular member, generally indicated at 11, and coupling means, generally indicated at 20 (as best viewed in FIGS. 2 and 3), for connecting the ends of the tubular member 11 to fittings for conducting fluid therethrough.

The tubular member 11 includes an inner organic polymeric liner 12. The liner 12 is preferably extruded and has a wall thickness of between 0.001 and 0.120 inches. The inner liner 12 is preferably made of a fluorocarbon polymer. Specifically, the inner liner is made of the polymer of tetrafluoroethylene (PTFE), the polymer of fluorinated ethylene propylene (FEP), the polymer of perfluoroalkoxy resin (PFA), or the polymer of ethelyne-tetrafluoroethylene (ETFE). The fluorocarbon polymers PTFE, FEP, and PFA are sold under the trademark TEFLON by Dupont. The polymer ETFE is sold under the trademark TEFZEL by Dupont.

The inner liner 12 is impervious to fluid flow through the wall. Since the inner liner 12 is preferably made of a fluorocarbon polymer material, it is resistant to both heat and chemical degradation. This allows a variety of fluids, particularly vehicle fuels, to pass through the interior of the liner 12 without corroding the liner 12.

Figure 1:
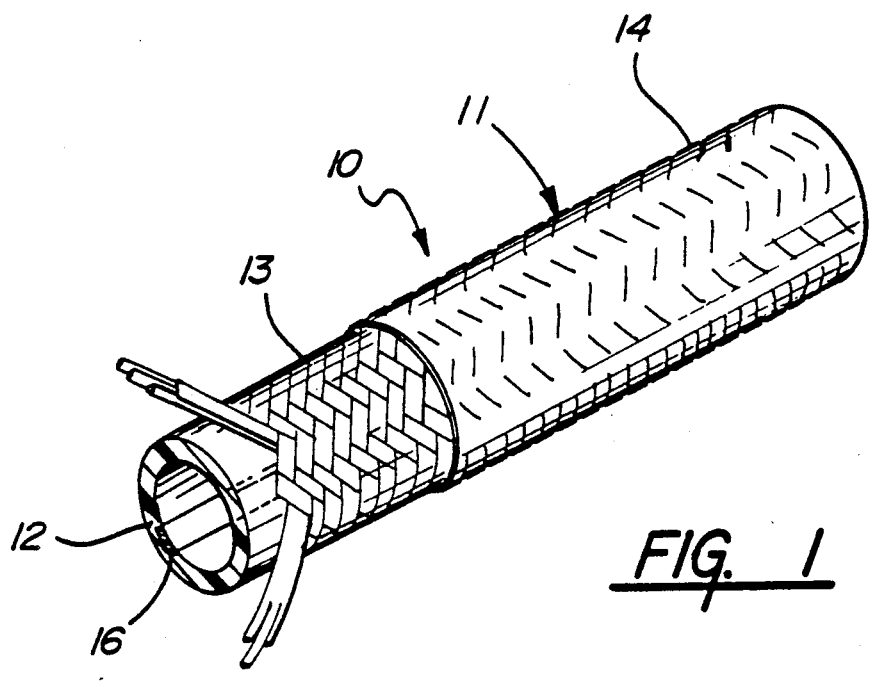
FIG. 1 is a perspective view of the preferred embodiment of the instant invention.

The assembly 10 further includes a braided or woven layer 13 about the exterior of the inner liner 12, as shown exposed in the left portion of FIG. 1. The braided layer 13 can comprise any nonmetallic material disposed in interleaving fashion or wrapped tightly about the inner liner 12. Preferably the material to be used for the braided layer 1 is glass fiber. Glass fibers provide the necessary strength. Further, glass fibers are heat resistant which is important for use in heated environments and for making the assembly as will be described subsequently.

The braided or woven fibers may be tightly wound or they may be loosely wound about the inner liner 12 having wide gaps between adjacent fibers. In the preferred embodiment, the glass fibers are tightly woven such that the gaps or spaces between adjacent fibers in minimal. The braided layer 13 adds to the strength of the inner liner 12. Particularly, by using a braided layer 13, the working pressure of the inner liner 12 is increased, allowing a higher pressure fluid to flow through the inner liner 12. Further, the braided layer 13 adds to the tensile strength of the hose assembly 10. When coupling members 20 are disposed on the ends of the tubular member 11, as will be described subsequently, the braided layer 13 increases the tensile strength of the hose assembly 10 sufficiently to fixedly connect any type of coupling member 20 to the tubular member 11. Finally, the braided layer adds to the hoop strength of the inner liner.

Figure 4:
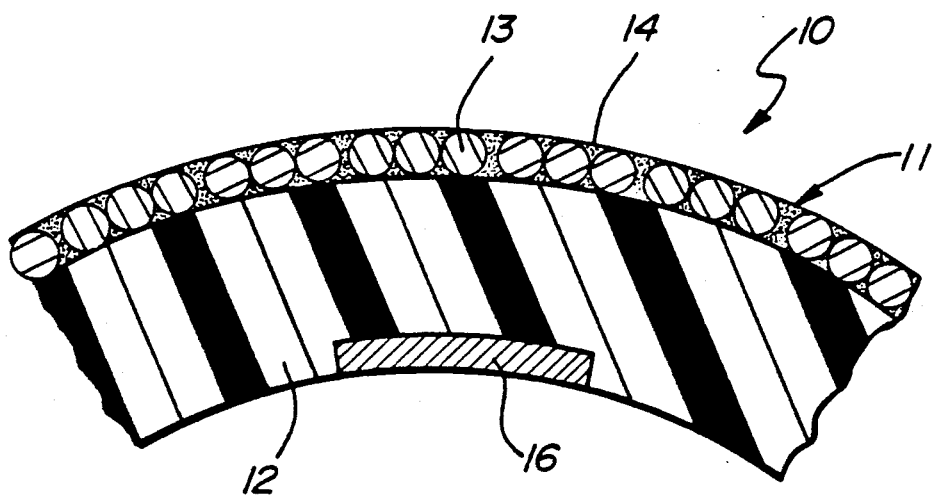
FIG. 4 is an enlarged sectional view of the hose assembly.

The assembly 10 further includes an organic polymeric dispersion or coating 14 in the braided layer 13. Specifically, an organic polymeric material is dispersed about the braided layer 13 and is located from the outer periphery of the braided layer 13 radially inwardly toward the inner liner 12 (as best viewed in FIG. 4). The organic polymeric material is deposited in the intricies of the braided layer 13. The coating 14 preferably comprises a fluorocarbon polymer. Specifically, the coating 14 comprises the polymer of tetrafluoroethylene (PTFE), the polymer of fluorinated ethylene propylene (FEP), the polymer of perfluoroalkoxy resin (PFA), or the polymer of ethylene-tetrafluoroethylene (ETFE).

The coating 14 covers or coats the glass fibers of the braided layer 13, as shown on the right portion of FIG. 1. That is, the coating 14 covers the fibers of the braided layer 13 from the outer periphery radially inwardly. The coating, therefore, does not extend radially outwardly from the outer periphery of the braided layer 13. After the material has been coated, each fiber is discernible. In effect, what results is a coating 14 having the braided layer 13 therein.

The outer coating 14 is preferably formed by first braiding or wrapping the material 13 about the exterior of the inner liner 12. The organic polymeric material is then dispersed into the braided material 13 from the outer periphery of the braided layer 13 radially inwardly toward the inner liner. Preferably, the organic polymeric material is a fluorocarbon polymer in a dispersion. In other words, the coating 14, as applied, comprises the fluorocarbon polymer and at least one carrying fluid. The preferable fluid is water. It will be appreciated that any suitable fluid may be used. The fluorocarbon polymer dispersion coats or is dispersed throughout the entire braided layer 13. Specifically, the fluorocarbon polymer dispersion effectively coats each of the glass fibers from the outer periphery radially inwardly. That is, the glass fibers are coated such that any gap between adjacent fibers will be filled with the polymer dispersion by a widening action. Also, the outer periphery of each fiber is completely coated. The carrying fluid is then removed from the dispersion by drying. This leaves a fluorocarbon polymer material dispersed throughout braided layer 13 and therefore connects braided layer 13 to the inner liner 12 forming a single layer.

As previously stated, both the inner liner 12 and coating 14 are preferably fluorocarbon polymers. It is, however, not necessary that both the inner liner 12 and coating 14 be of the same fluorocarbon polymer, although they may be. For example, the inner liner 12 may be made of PFA while the coating 14 is made of PTFE. Any combination of the fluorocarbon polymers listed may be utilized for the inner liner 12 and coating 14.

The coating 14 in conjunction with the braided layer 13 allows the inner liner 12 to be bent without kinking. That is, the coating 14 dispersed throughout the braided layer 13 provides strength to the inner liner 12 upon bending. This is commonly referred to as hoop strength. Thus, by using a polymeric coating 14 dispersed throughout the braided layer, a trim profile assembly is produced which results in the hoop strength of the tubular member 11 being increased so that the tubular member 11 can be bent without kinking the inner liner 12. Further, the outer coating 14 adds to the working pressure of the hose. That is, the coating 14 provides strength and allows the inner liner 12 to accommodate a fluid under pressure. Also, the coating 14 hinders abrasion of the tubular member. Said another way, the coating 14 aids in abrasion resistance of the tubular member 11. That is, because the coating is continuous about the outer periphery of the braided layer 13, the braided layer is not subject to abrasion. The coating 14 resists abrasion.

Figure 3:
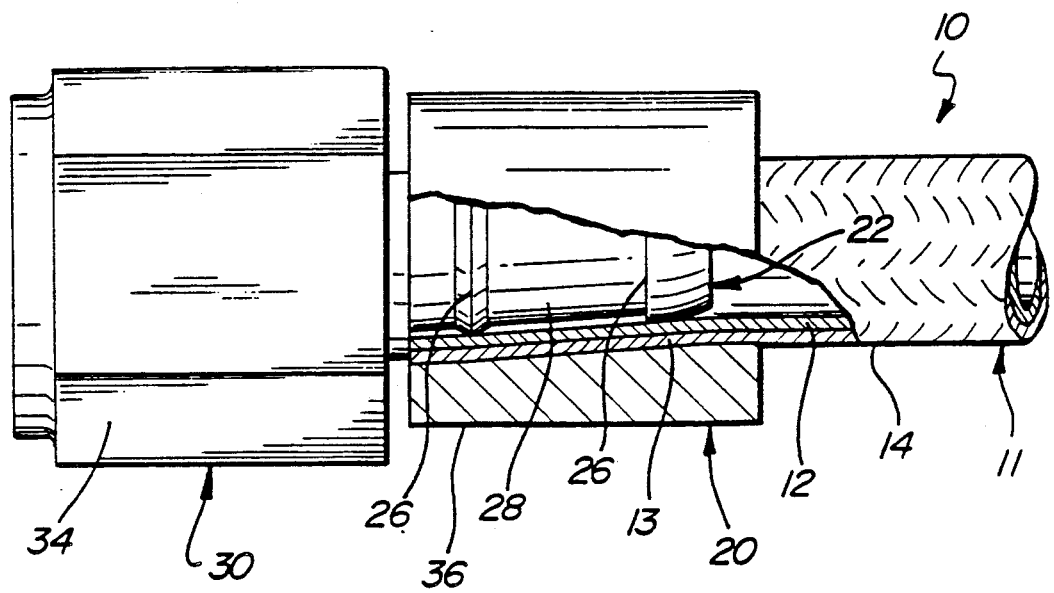
FIG. 3 is a side view partially broken away of the preferred embodiment of the instant invention including an alternative coupling member.

The assembly 10 further includes coupling means generally indicated at 20. The coupling means 20 is for connecting the assembly 10 to a fitting (not shown). The fitting is adapted to cooperate with the coupling means 20. Specifically, the coupling means 20 comprises a coupling assembly 20. The coupling assembly 20 includes an insert portion, generally indicated at 22 for inserting into and engaging the interior inner liner 12. The insert portion 22 may have a plurality of barbs 24 for engaging the interior of the inner liner 12 (as best viewed in FIG. 2). Alternatively, the insert portion may have a pair of annular ridges 26, and a smooth portion 28 therebetween (as best viewed in FIG. 3). The coupling assembly 20 further includes an engaging portion generally indicated at 30 extending longitudinally from the insert portion. The engaging portion is for engaging a fitting (not shown) adapted to cooperate therewith. The engaging portion 30 may comprise a male threaded member 32 (FIG. 2) or a female threaded member 34 (FIG. 3). The engaging portion 30 may also comprise any configuration adapted to cooperate with a member to which it will be fixed. For example, the engaging portion 30 may comprise a socket to receive a mating ball joint. Finally, the coupling assembly 20 includes a locking collar 36. The locking collar 36 is disposed about the exterior of the outer coating 14 and is slid over the insert portion 22 of the coupling assembly 20. In this manner, the inner liner 12 is forced into tight frictional engagement with the insert portion 22 to prevent relative axial movement between the inner liner 12 and insert portion 22. The coupling assembly 20 can be of any other well known type. For example, the coupling assembly 20 may be of an organic polymeric material and may be molded about the tubular member 11 for a mechanical connection or fusion bond.

As fluid flows through the inner liner 12, electrical charges tend to build throughout the length of the inner liner 12. In order to prevent these electrical charges from accumulating, the inner liner 12 has an integral longitudinal conductive means coextensive with the length of the inner liner 12 for conducting an electrical charge through the liner. Preferably, the inner liner 12 has a conductive strip 16 of carbon black. This carbon black is electrically conductive and will dissipate any electrical charges built up by the fluid. Alternatively, the whole inner tubular member 12 can comprise the conductive means. This is done by using carbon black about the entire inner liner 12. The braided layer 13 and coating 14 are preferably electrically non-conductive. This is important in that electrical changes applied to the exterior of the outer coating 14 will not be conducted throughout the length of the tubular member 11 or to the fluid passing through the interior of the inner liner 12. It will be appreciated that other conductive material may be used to form the conductive strip 16.

The preferred method for making a hose assembly 10 as shown is as follows. An inner organic polymeric tubular member 12 is provided. Specifically, the inner tubular member 12 of a fluorocarbon polymer is extruded. A nonmetallic or wound material (preferably glass fiber) is then braided or wound about the exterior of the inner liner 12 to form a braided layer 13. An organic polymeric material dispersion 14 is then dispersed throughout the braided layer 13 from the outer periphery radially inwardly toward the inner liner 12. Specifically, the inner liner 12 and braided material are passed through a reservoir containing a dispersion of an organic polymeric material and at least one carrying fluid. Alternatively, the dispersion may be sprayed onto braided material. Preferably, the dispersion is an aqueous dispersion of a fluorocarbon polymer. Because the dispersion is preferably aqueous, the carrying fluid used is preferably water. The dispersion is disposed throughout the entire braided layer 13. The carrying fluid, preferably water, is then removed from the solution. Specifically, the assembly 10 is sent to a dryer, a preheat oven which is preferably below the boiling temperature of the solvent (water). By utilizing an oven below the boiling temperature of the carrying fluid, a bubbling effect is avoided in the final product. The temperature can be above the boiling temperature, however, the assembly (10) may contain many air bubbles in the outer coating 14 if higher temperatures are used. The carrying fluid (water) is removed to leave a coating 14 of an organic polymeric material dispersed throughout the braided material 13. The assembly 10 is then sintered at a suitable temperature to cure the organic polymeric coating 14 and connect the braided layer 13 to the inner liner 12 forming a single layer. Because glass fibers are used for the braided layer 13, the braided layer 13 is unaffected by the heat required to sinter the assembly 10. Finally, a coupling member 20 may be secured on one or both ends of the tubular member 11 to secure the assembly 10 to a fitting (not shown) for conducting fluid through the inner liner 12.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A hose assembly (10) consisting of: a tubular member (11) and coupling means (20) for connecting the ends of said tubular member (11) to fittings for conducting fluid therethrough; said tubular member (11) including an inner fluorocarbon polymeric liner (12), a reinforcing layer (13) having gaps extending therethrough about the exterior of said inner liner (12), said assembly characterized by including an organic polymeric material consisting essentially of a fluorocarbon polymer which is resistant to heat and chemical degradation and dispersed in said reinforcing layer from the outer periphery radially inwardly toward the inner liner (12) for strengthening said layer, said organic polymeric material connecting said reinforcing layer to said liner (12) as a single layer.

2. An assembly as set forth in claim 1 further characterized by said fluorocarbon polymeric material of said tubular member (11) comprising the same material as said organic polymeric material which is dispersed in said reinforcing layer.

3. An assembly as set forth in claim 2 further characterized by said reinforcing layer (13) comprising a tightly wound nonmetallic braid.

4. An assembly as set forth in claim 3 further characterized by said braid comprising glass fiber.

5. An assembly as set forth in claim 3 further characterized by said inner liner (12) having an integral longitudinal conductive means (16) coextensive with the length of said inner liner (12) for conducting electrical charge through said inner liner (12).

6. An assembly as set forth in claim 5 further characterized by said conductive means (16) comprising carbon black.

7. An assembly as set forth in claim 1 further characterized by said fluorocarbon polymer comprising the polymer of tetrafluoroethylene.

8. An assembly as set forth in claim 1 further characterized by said fluorocarbon polymer comprising the polymer of fluorinated ethylene propylene.

9. An assembly as set forth in claim 1 further characterized by said fluorocarbon polymer comprising the polymer of perfluoroalkoxy.

10. An assembly as set forth in claim 1 further characterized by said fluorocarbon polymer comprising the polymer of ethelynetetrafluorethylene.

11. An assembly as set forth in claim 1 further characterized by said coupling means (20) comprising; an insert portion (22) for engaging the interior of said inner liner (12); and an engaging portion (30) extending longitudinally from said insert portion (20) for engaging a fitting.

12. An assembly as set forth in claim 11 further characterized by said coupling means (20) further comprising a locking collar disposed about the exterior of said outer coating (14) for forcing said inner liner (12) into engagement with said insert (22) portion and preventing relative axial movement therebetween.

* * * * *

REEXAMINATION CERTIFICATE (2840th)

United States Patent [19]
Martucci

[11] B1 5,124,878
[45] Certificate Issued Apr. 9, 1996

[54] COATED BRAIDED HOSE METHOD

[75] Inventor: Norman S. Martucci, Birmingham, Mich.

[73] Assignee: Teleflex Inc, Limerick, Pa.

Reexamination Request:
No. 90/003,162, Aug. 16, 1993

Reexamination Certificate for:
Patent No.: 5,124,878
Issued: Jun. 23, 1992
Appl. No.: 730,378
Filed: Jul. 12, 1991

Related U.S. Application Data

[63] Continuation of Ser. No. 416,151, Oct. 2, 1989, abandoned, which is a continuation-in-part of Ser. No. 305,643, Feb. 2, 1989, abandoned.

[51] Int. Cl.⁶ .................................................. H05F 3/00
[52] U.S. Cl. ................... 361/215; 138/125; 138/DIG. 3; 174/47
[58] Field of Search ...................... 174/47; 361/212, 361/215, 220; 138/123, 124, 125, DIG. 3

[56] References Cited

U.S. PATENT DOCUMENTS

| | | | |
|---|---|---|---|
| 2,783,173 | 2/1957 | Walker et al. | 156/190 |
| 3,023,787 | 3/1962 | Phillips et al. | 138/121 |
| 3,166,688 | 1/1965 | Rowland et al. | 174/68.3 |
| 3,857,415 | 12/1974 | Morin et al. | 138/122 |
| 4,215,384 | 7/1980 | Elson | 361/215 |
| 4,306,591 | 12/1981 | Arterburn | 138/125 |

OTHER PUBLICATIONS

"Titeflex—50 Years of Specialization in Energy Transmission".

*Primary Examiner*—Fritz M. Fleming

[57] ABSTRACT

A lightweight hose assembly of the type adapted for carrying fuels and other corrosive fluids. The assembly (10) includes a tubular member (11) and a pair of coupling members (20). The tubular member (11) includes an inner liner (12) of a fluorocarbon polymer. A glass fiber is braided about the exterior of the inner liner (12) to form a braided layer (13). The assembly (10) further includes an outer fluorocarbon coating (14) dispersed throughout the braided layer (13) for preventing kinking or permanent deformation of the inner liner (12). A conductive strip (16) is formed on the inner liner (12) for dissipating electrical charges accumulated in the inner liner (12). A method of making the assembly (10) comprises the steps of extruding the inner liner (12). A nonmetallic material (13) is then braided about the exterior of the liner (12). The inner liner (12) and braided layer (13) are then passed through a reservoir containing a solution of the fluorocarbon polymer. The solvent is then removed, leaving a fluorocarbon polymer coating (14) dispersed throughout the braided layer (13).

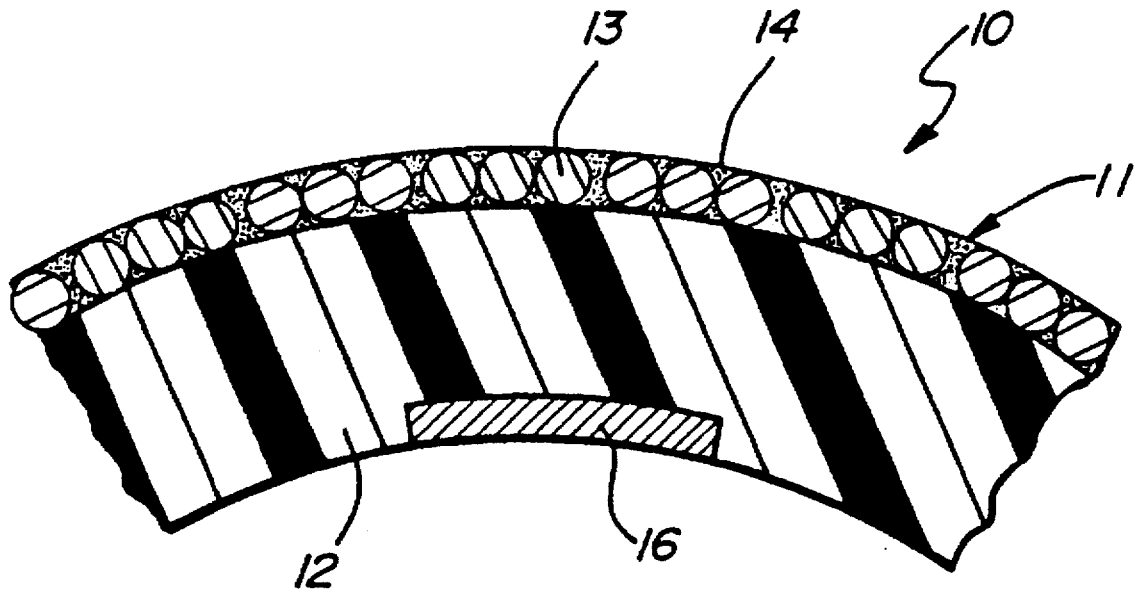

B1 5,124,878

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is determined to be patentable as amended.

Claims 2–12, dependent on an amended claims, are determined to be patentable.

1. A hose assembly (10) consisting of: a tubular member (11) and coupling means (20) for connecting the ends of said tubular member (11) to fittings for conducting fluid therethrough; said tubular member (11) including an *extruded and seamless* inner fluorocarbon polymeric liner (12), a reinforcing layer (13) having gaps extending therethrough about the exterior of said inner liner (12), said assembly characterized by including an organic polymeric material consisting essentially of a fluorocarbon polymer which is resistant to heat and chemical degradation and dispersed in said reinforcing layer from the outer periphery radially inwardly toward the inner liner (12) for strengthening said layer, said organic polymeric material connecting said reinforcing layer to said liner (12) as a single layer.

* * * * *